United States Patent

Wu et al.

[11] Patent Number: 5,859,905
[45] Date of Patent: *Jan. 12, 1999

[54] CYCLE-MODULATING TYPE OF DUAL-TONE MULTIFREQUENCY GENERATOR

[75] Inventors: Rong-Tyan Wu, Taichung; Herman Chung, Hsinchu, both of Taiwan

[73] Assignee: Holtek Microelectronics,Inc., Hsincho, Taiwan

[ * ] Notice: The term of this patent shall not extend beyond the expiration date of Pat. No. 5,714,954.

[21] Appl. No.: 716,937

[22] Filed: Sep. 20, 1996

[51] Int. Cl.$^6$ ............... H04M 1/00; H04M 3/00; H03M 1/66

[52] U.S. Cl. ............ 379/361; 379/350; 379/357; 379/353; 341/147

[58] Field of Search ................... 379/283, 351, 379/355, 361, 362, 357, 353, 350, 386; 341/147

[56] References Cited

U.S. PATENT DOCUMENTS

| | | | |
|---|---|---|---|
| 4,068,178 | 1/1978 | Tunzi | 327/107 |
| 4,998,276 | 3/1991 | Hasegawa | 379/361 |
| 5,027,389 | 6/1991 | Chiue et al. | 379/361 |
| 5,034,977 | 7/1991 | Chen et al. | 379/418 |
| 5,714,954 | 2/1998 | Chung et al. | 341/147 |

*Primary Examiner*—Harry S. Hong
*Assistant Examiner*—Benny Q. Tieu
*Attorney, Agent, or Firm*—W. Wayne Liauh

[57] ABSTRACT

A cycle-modulating DTMF generator for generating a DTMF signal; the generator comprises a programmable time-pulse generator, counters or up/down counters, a memory unit for storing data, a digital adder, and a digital-to-analog converter. The circuit of such generator is substantially a digital circuit so as to overcome the problem of signal distortion, which usually exists in an analog circuit.

6 Claims, 6 Drawing Sheets

| Data values (Relative Voltages Values) | Digital values of data stored | Counting digits |
|---|---|---|
| 0 | 00000 | 0000 |
| 0.61 | 00001 | 0001 |
| 1.86 | 00011 | 0010 |
| 3.56 | 00101 | 0011 |
| 5.74 | 01000 | 0100 |
| 8.19 | 01011 | 0101 |
| 11.00 | 01110 | 0110 |
| 13.98 | 10001 | 0111 |
| 16.96 | 10100 | 1000 |
| 19.94 | 10110 | 1001 |
| 22.75 | 10111 | 1010 |
| 25.30 | 11001 | 1011 |
| 27.48 | 11011 | 1100 |
| 29.18 | 11101 | 1101 |
| 30.34 | 11110 | 1110 |
| 30.95 | 11111 | 1111 |
| 30.34 | 11110 | 1110 |
| 29.18 | 11101 | 1101 |
| 27.48 | 11011 | 1100 |
| 25.30 | 11001 | 1011 |
| 22.75 | 10111 | 1010 |
| 19.94 | 10110 | 1001 |
| 16.96 | 10100 | 1000 |
| 13.98 | 10001 | 0111 |
| 11.00 | 01110 | 0110 |
| 8.19 | 01011 | 0101 |
| 5.74 | 01000 | 0100 |
| 3.56 | 00101 | 0011 |
| 1.86 | 00011 | 0010 |
| 0.61 | 00001 | 0001 |

FIG. 5

| Data values (Relative Voltages Values) | Digital values of data stored | Counting digits | True address |
|---|---|---|---|
| 0.07 | 00000 | 0000 | 0000 |
| 0.67 | 00001 | 0001 | 0001 |
| 1.82 | 00011 | 0010 | 0010 |
| 3.52 | 00101 | 0011 | 0011 |
| 5.67 | 01000 | 0100 | 0100 |
| 8.19 | 01011 | 0101 | 0101 |
| 11.00 | 01110 | 0110 | 0110 |
| 13.98 | 10001 | 0111 | 0111 |
| 17.02 | 10100 | 1000 | 1000 |
| 20.00 | 10110 | 1001 | 1001 |
| 22.81 | 10111 | 1010 | 1010 |
| 25.33 | 11001 | 1011 | 1011 |
| 27.48 | 11011 | 1100 | 1100 |
| 29.17 | 11101 | 1101 | 1101 |
| 30.33 | 11110 | 1110 | 1110 |
| 30.93 | 11111 | 1111 | 1111 |
| 30.93 | 11111 | 0000 | 1111 |
| 30.33 | 11110 | 0001 | 1110 |
| 29.17 | 11101 | 0010 | 1101 |
| 27.48 | 11011 | 0011 | 1100 |
| 25.33 | 11001 | 0100 | 1011 |
| 22.81 | 10111 | 0101 | 1010 |
| 20.00 | 10110 | 0110 | 1001 |
| 17.02 | 10100 | 0111 | 1000 |
| 13.98 | 10001 | 1000 | 0111 |
| 11.00 | 01110 | 1001 | 0110 |
| 8.19 | 01011 | 1010 | 0101 |
| 5.67 | 01000 | 1011 | 0100 |
| 3.52 | 00101 | 1100 | 0011 |
| 1.83 | 00011 | 1101 | 0010 |
| 0.67 | 00001 | 1110 | 0001 |
| 0.07 | 00000 | 1111 | 0000 |

FIG. 6

CYCLE-MODULATING TYPE OF DUAL-TONE MULTIFREQUENCY GENERATOR

BACKGROUND OF THE INVENTION

1. Field of the Invention

This invention relates to a cycle-modulating type of dual-tone multifrequency (DTMF) generator, and particularly to a generator for generating a DTMF signal by means of a digital circuit.

2. Description of the Prior Art

A conventional DTMF generator is usually an analog circuit device as shown in FIG. 1, in which the block 1 is the pick-up switch assembly of DTMF voltage signal; the blocks 2 and 3 form into an assembly of tracer and buffer circuits; the block 4 is an analog signal adder; the block 5 is a reference voltage generator. The aforesaid analog circuit is subject to interference or signal distortion because of manufacturing process, temperature or environmental factors; consequently, the output value thereof is seldom conformed to the actual value; further, after an analog circuit being used for a long time, the elements thereof are subject to becoming aged, and the output values thereof will be affected; therefore, the accuracy of a conventional analog circuit for generating DTMF signal is difficult to control, especially during at a lower voltage. Regarding the manufacturing process, the analog circuit has no flexibility in terms of circuit board area because of its characteristics, i.e., the circuit board can be reduced to a given extent only, having no breakthrough further. Moreover, when the telephone line is designed, the column value signal (voltage value) and the row value signal have a ratio gain of 2 dB. But a conventional analog adder can only control the gain in a range from 1–3 dB, i.e., unable to control the gain at 2 dB exactly, and therefore the accuracy thereof is in accurate.

SUMMARY OF THE INVENTION

The present invention is used for generation a DTMF signal by means of a theory of different cycles of a column signal or a row signal from a keyboard, and by means of same amplitude values(the same amplitude values have been stored in the memory unit) which are obtained by changing the time interval of every output signal the column signal wave and the row signal wave, and by using a digital adder and a digital-to-analog converter. The signal wave generated through the telephone dial column and row is a sine wave, in which the portions of 0°~90° and 90°~180° are symmetrical, while the portions 180°~270° and 270°~360° are symmetrical so as to have the two lateral axis values become corresponding to the longitudinal axis values; in that case, one half of the longitudinal axis values is necessary to fill up a cycle of a sine wave so as to reduce the capacity of a memory unit in order to cut down the manufacturing cost to conform to economical principle.

The prime object of the present invention is to provide a digital circuit type of adjustable-period DTMF generator to overcome the interference or distortion of a conventional DTMF generator as a result of the manufacturing process, temperature and environmental factors; such a digital circuit can, under any working voltage and temperature, accurately control the gain of a column value signal to a row value signal (relative voltage values) at 2 dB so as to maintain the circuit at a high accuracy always.

Another object of the present invention is to provide a digital circuit type of adjustable-period DTMF generator so as to overcome the problem of a conventional analog circuit type of DTMF generator, of which the manufacturing process and characteristics cause the circuit board area to reduce only to a given extent without making further breakthrough. In a digital circuit, the circuit board area thereof can be reduced considerably because of technical breakthrough, i.e., the manufacturing technology of the circuit board area has a large flexibility.

Still another object of the present invention is to provide a digital circuit type of adjustable-period DTMF generator, in which the memory for the pre-stored data can be made with several methods so as to obtain a higher flexibility. The inventor can design a generator in accordance with an individual requirement without being limited by the manufacturing space thereof A further object of the present invention is to provide an adjustable-period DTMF generator, in which the signal wave generated in every column or row on the keyboard dial is a sine wave, i.e., in a sine wave of 360°, the portions of 0°~90° and 90°~180° are symmetrical, while the portions of 180°~270° and 270°~360° are also symmetrical so as to have the two lateral axis values are corresponding to the longitudinal value; in other words, a sine wave can be formed by means of a half of longitudinal value only. By means of such characteristics and the (up/down) counters, the memory unit for storing the data value (relative voltage value) of a signal wave can generate a cycle of sine wave by using one half of the longitudinal axis value (i.e., one half of the date value [relative voltage value]); therefore, the capacity of the memory unit can be reduced so as to cut down the manufacturing cost thereof, and to conform to economical principle.

BRIEF DESCRIPTION OF THE DRAWINGS

FIG. 5 illustrates the related data of the signal waves stored in the embodiment according to the the present invention.

FIG. 6 illustrates the related data of the signal waves stored in the other embodiment according to the present invention.

DETAILED DESCRIPTION

Figure 2:
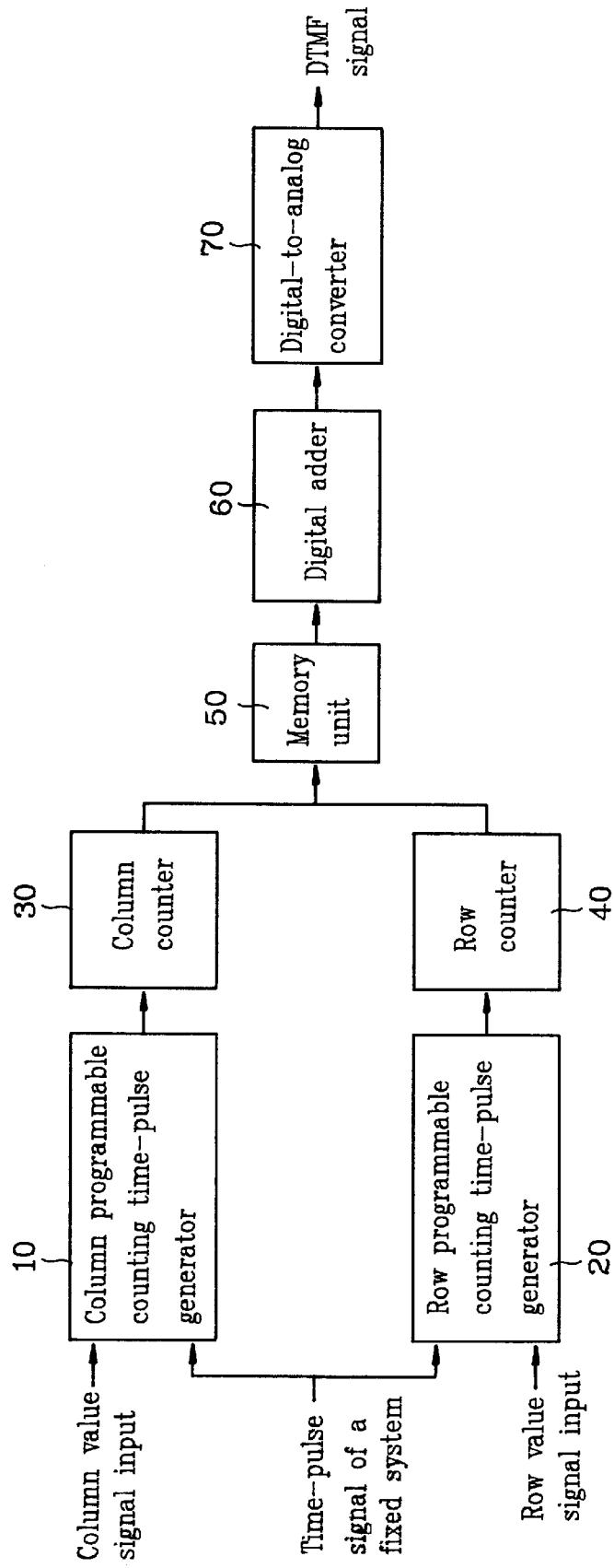
FIG. 2 is the block diagram of the embodiment according to the present invention.
Figure 3:
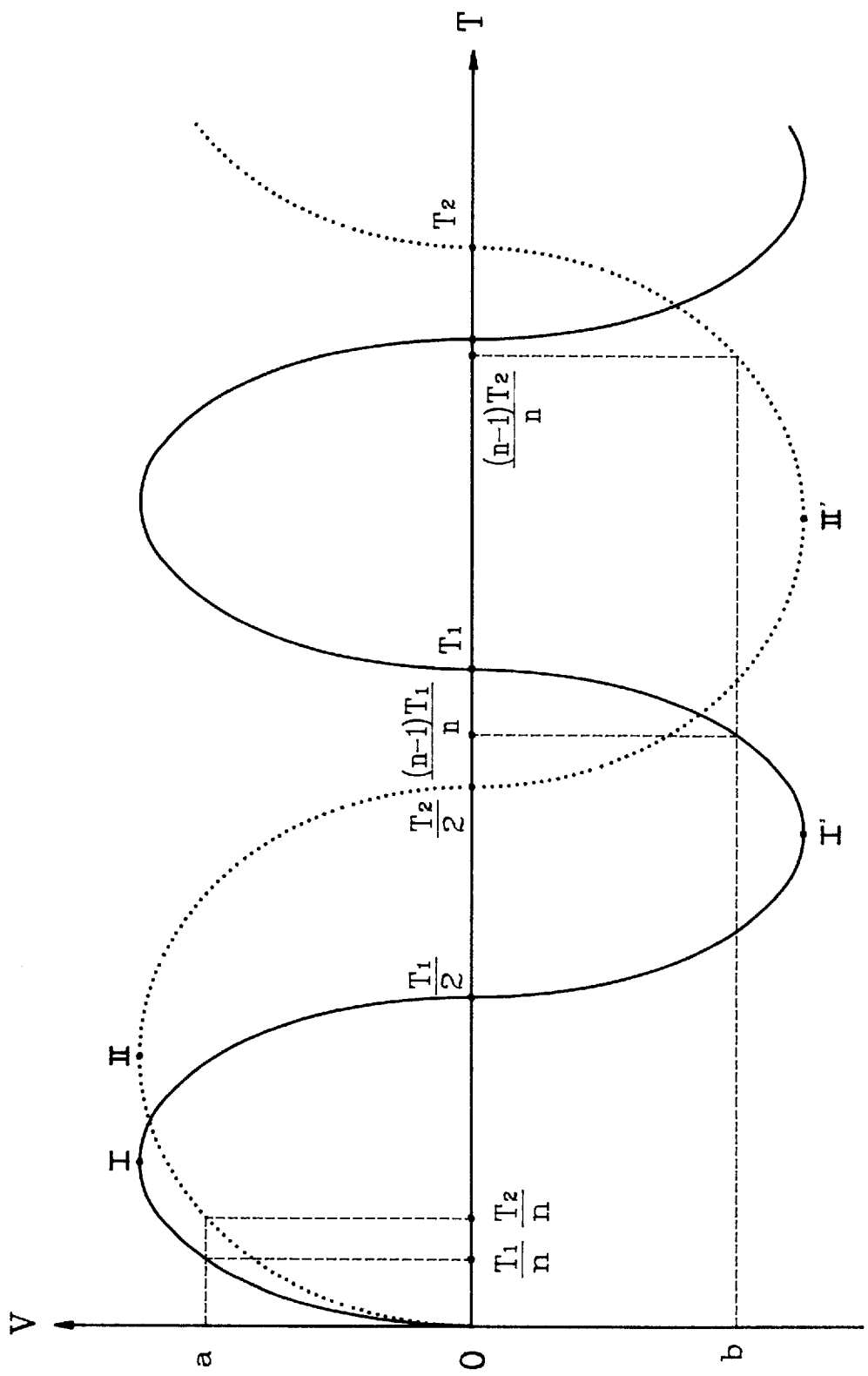
FIG. 3 illustrates the signal waves form of the embodiment according to the present invention.

FIG. 2 is a block diagram of an embodiment according to the present invention, in which a time-pulse signal of a fixed system is sent into the column programmable counting time-pulse generator 10 and the row programmable counting time-pulse generator 20 respectively; then, a column value signal and a row value signal generated by keying will be sent to the column programmable counting time-pulse generator 10 and the row programmable counting time-pulse generator 20 respectively. The aforesaid two generators 10 and 20 will divide the signal cycle values of the column and row values and every cycle of a signal designed by a user into a given number of sections, and will operate the time interval of every section (as shown in FIG. 3, the details thereof will be given in the following paragraph) so as to generate a counting time-pulse at a frequency required by the column and the row, and to send out the counting 15 time-pulse to the column (up/down) counter 30 and the row (up/down) counter 40. In accordance with the output signals of the two programmable counting time-pulse generators 10 and 20, the column (up/down) counter 30 and the row (up/down) counter 40 send out an address signal at a given time interval and corresponding to a given time to the memory unit 50. The memory unit 50 has been stored, in advance, data values (relative voltage values) from a fixed period of time; after finding out an address corresponding to said fixed period of time, the column output part and the row output part of the memory unit 50 will respectively send out a data value, corresponding to the address stored, to the digital adder 60, which will operate each of the data values before sending a signal to the digital-to-analog converter 70; then, the converter 70 will send out a DTMF signal. The aforesaid relative voltage value is the amplitude sent out from the digital-to-analog converter; there is a ratio relation between the amplitude and the stored data.

FIG. 3 illustrates the signal waves of the column (or row) of the embodiment according to the present invention, in which the lateral axis represents the time value, while the longitudinal axis represents the voltage value; the sine wave I 80 and the sine wave II 90 have the same amplitude, but the cycle time of the sine wave I 80 is longer than that of the sine wave II 90; in this case, if the inventor wants to design each cycle of the signal wave to be divided into "N" sections, the programmable counting time-pulse generators can calculate the time interval of every section of the sine wave I 80 and the sine wave II 90 to be $T_1/n$ and $T_2/n$ respectively. The amplitude voltage values "a" (voltage) of the $T_1/n$ and $T_2/n$ are the same; likewise, every two time intervals, such as 2 $T_1/n$ and 2 $T_2/n$, 3 $T_1/n$ and 3 $T_2/n$, ..., $(n-1)$ $T_1/n$ and $(n-1)$ $T_2/n$. (the same amplitude value "b"), $T_1$ and $T_2$ have the same amplitude (voltage value); therefore, the memory unit 50 as shown in FIG. 2 has stored, in advance, the fixed time intervals ($T_1/n$ and $T_2/n$), i.e., the data values (relative voltage values) for the column (or row) signal.

Figure 1:
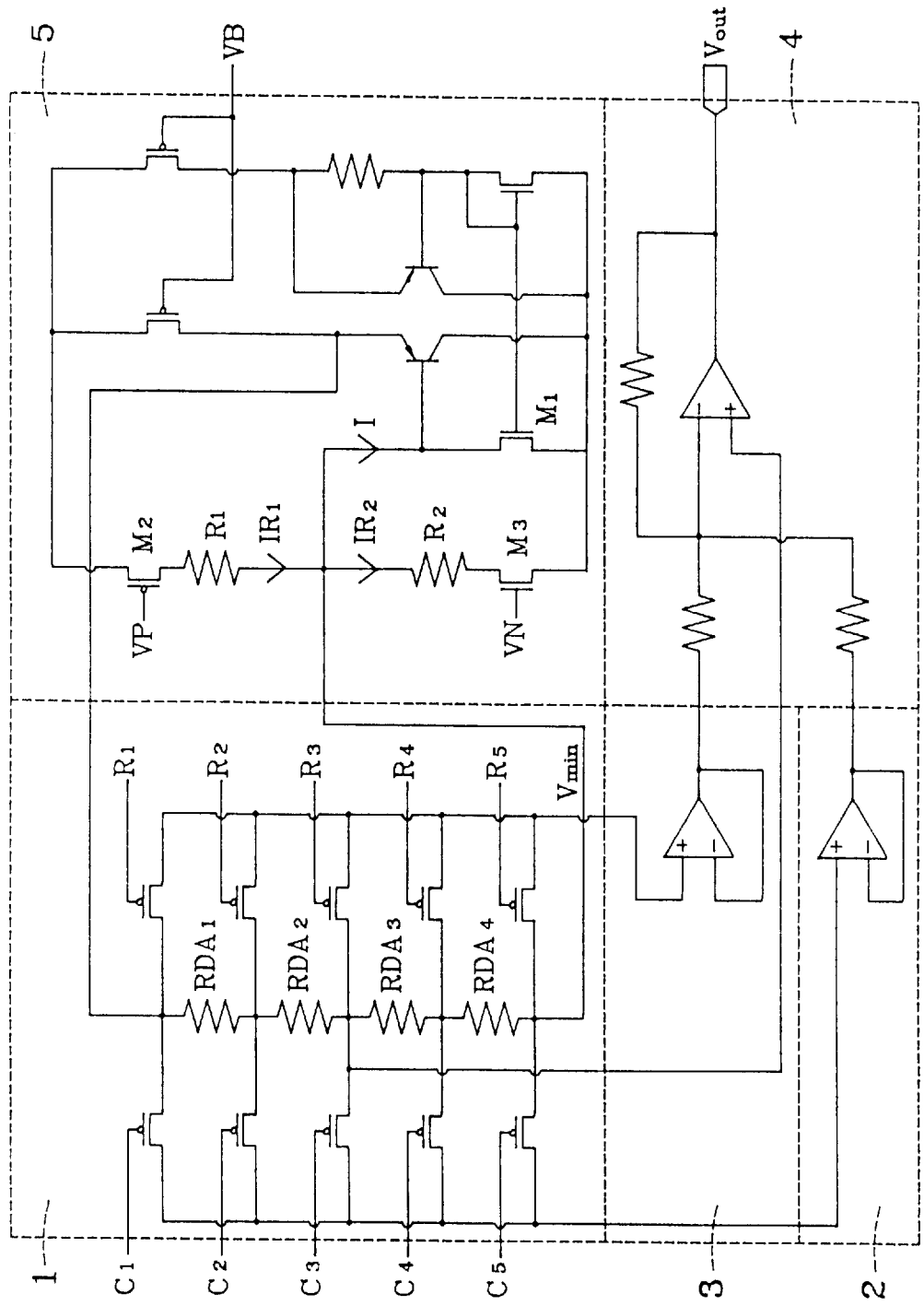
FIG. 1 is the block diagram of the conventional DTMF (dual tone multi-frequency ) generator.
Figure 4:
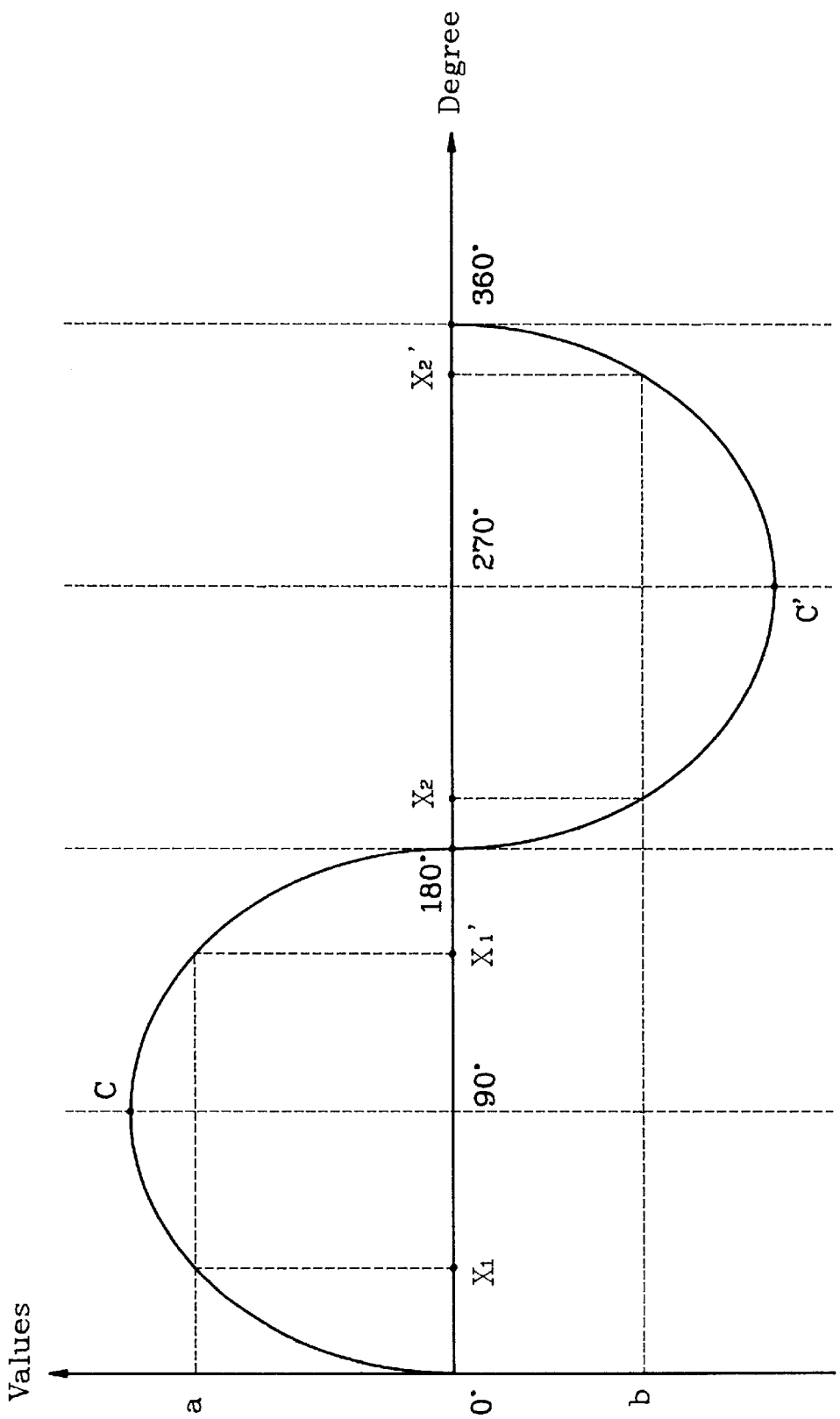
FIG. 4 illustrates a sine wave form of the present invention.

FIG. 4 illustrates a sine wave form of 360°, in which 0°~90° and 90°~180° are symmetrical in form, while 180°~270° and 270°~360° are symmetrical in form; the values of the two sections of the lateral axis are equal to that of the two corresponding sections of the longitudinal axis. As shown in that FIG., the $X_1$ is set between 0°~90°, while $X'_1$ is set between 90°~180°; also $X_1$ and $X'_1$ are corresponding to the same longitudinal axis value a. Likewise, $X_2$ is set between 180°~270°, while $X'_2$ is set between 270°~360°; the $X_2$ and $X'_2$ are fallen on the symmetrical and same longitudinal axis value b. Therefore, a cycle of sine wave form can be formed simply by filling a plurality of points for a half of the longitudinal axis value (see FIGS. 5 and 6); for example, the longitudinal axis values filled from 90° to 270° will include all the longitudinal axis values of the sine wave; likewise, the memory units 50 as shown in FIG. 2 may merely be stored with one half of the data values (relative voltage values) of one cycle of the aforesaid signal so as to reduce the memory capacity of the memory unit, and to cut down the manufacturing cost as well; however, the aforesaid theoretical idea still has some difficulties to be overcome in terms of practice. For instance, the peak points c and c' between 90°~270° of the aforesaid FIG. 4 have no corresponding points, and therefore the counter has to make another process on the connecting point between 90° (peak point) and 270° (peak point), i.e., by using an up-down counter to perform ascending counting or descending counting. As shown in FIG. 5, the counting is made from 0000 up to 1111, and then the counting is made from 1111 down to 0000. Each cycle of the aforesaid signal wave is divided into 30 scale numerals, and each scale numeral has a corresponding data value (a relative voltage value). As shown in FIG. 1, the data values 0 and 30.95 are the peak points respectively. As a result of the characteristics of the sine wave, each scale numeral of the ascending counting half cycle (the data values from 0 to 30.95) and the descending counting half cycle (the data values from 30.95 to 0) of the sine wave has a corresponding and same data value as shown in FIG. 5; therefore, the memory unit may only store the data value of the ascending counting half cycle or the descending counting half cycle. According to the system designed in FIG. 2 , a suitable counting, a counting cycle signal and an address signal can be generated so as to find out a corresponding address and to send out a data corresponding to said address. The descending counting cycle of the sine wave is set between 90°~270° thereof, while the ascending counting cycle is set between 0°~90° and 270°~360°; in other words, the data stored in the memory unit are the corresponding data values set between phase angles of (90°+n·360°) to (270°+n·360°), or the corresponding data values set between the phase angles of (n·360°) to (90°+ n·360°), and the phase angles of (270°+n·360°) to (n+1·360°); the "n" may be an integer.

Furthermore, the inventor has provided a solution of the asymmetrical problem of the aforesaid peak point having no corresponding point; the solution is that the memory units 50 as shown in FIG. 2 will be stored with the aforesaid peak value signal (i.e., the peak points I, I', II, and II' of the longitudinal axis values as shown in FIG. 3); instead, the phase of the signal wave can be set shifted at a small angle; in that case, a little bit of accuracy might be overlooked, but the tangent slope of the peak point of the sine wave is zero; therefore, the peak point and the sine wave will have little variation, and the output of the DTMF signal will not be affected; then, there will be no connection problem between the peak points; on the other hand, the circuit design will be much easier. As shown in FIG. 6, each cycle of the signal wave is divided into 32 scale numerals, of which each has a corresponding data value; for example, the data values are ranging from 0.07 to 30.93, and from 30.93 to 0.07; each scale numeral has a corresponding data value; therefore, the memory unit 50 can be stored with a data value merely corresponding one half cycle of the sine wave, i.e., the data values corresponding to the phase angles of (90°+n·360°) to (270°+n·360°), and the phase angles of (n·360°) to (90°+ n·360°). The difference between FIG. 5 and 6 is that a one-way ascending counting from 0000 to 1111, and then counting again from 0000 upwards. In the aforesaid counters, the flip-plops thereof can send out a given numeral and the complement numeral thereof simultaneously. Although a signal wave according to the embodiment has been divided into 32 scale numerals, a counter of 4 bits can be used for the counting operation by sending out a complement numeral during a suitable time period. As shown in FIG. 6, during counting from 0000 to 1111 at the second time, the output is the complement numerals; when counting from 0000 to 1111, the output is the complement numerals, but the actual counting addresses are from 1111 to 0000 to provide an up/down counting function.

According to the aforesaid description, it is apparent that the present invention has provided a digital circuit by means of having the same amplitude (voltage) and having different cycles (frequency),among the signal sine waves of the columns and rows, and by means of dividing into a given number of sections of a cycle by a user, and calculating every column (or row) to have the same amplitude (voltage)

in different time intervals; such a digital circuit can overcome the problems of signal distortion or interference which usually takes place in a conventional analog circuit because of manufacturing process, temperature and environmental factors, i.e., the present invention can elevate the precision of an output signal. Furthermore, the memory unit can generate a signal wave by merely storing one half of the data value (relative voltage value) of a signal cycle so as to cut down the manufacturing cost and to conform with economic principle.

What is claimed is:

1. A cycle-modulating type of DTMF generator, a digital circuit generator, comprising:

a column programmable counting time-pulse generator for receiving a column value input signal and a time-pulse signal of a fixed system, and performing operation in a cycle of a column signal wave and a given number of sections divided so as to generate a suitable counting of cycles and a counting time pulse, and simultaneously to send out a suitable counting of cycles and a counting time-pulse;

a row programmable counting time-pulse generator for receiving a row value input signal and a time-pulse signal of a fixed system, and performing operation in a cycle of a row signal wave and a given number of sections divided so as to generate a suitable counting of cycles and a counting time-pulse, and simultaneously to send out a suitable counting of cycles and a counting time-pulse;

a column counter for receiving an output signal out of said column programmable counting time-pulse generator, and sending out, at a given time interval, an address signal corresponding to a fixed period of time, and cyclic mode of said address signal being an up/down type of cycle;

a row counter for receiving an output signal out of said row programmable counting time-pulse generator, and sending out, at a given time interval, an address signal corresponding to a fixed period of time, and cyclic mode of said address signal being an up/down type of cycle;

a memory unit for receiving output signals out of said column counter and said row counter; after finding out a corresponding address of a fixed period of time, a pre-stored data value of said address being sent out;

a digital adder for receiving a data value out of said memory unit, and after operation to every said data value, an output signal being sent out;

a digital-to-analog converter for receiving an output signal out of said digital adder, and then converting said digital signal into an analog signal so as to send out a DTMF signal.

2. A cycle-modulating type of DTMF generator as claimed in claim 1, wherein said data stored in said memory unit are data values in phase angles of $(90°+n·360°)$ to $(270°+n·360°)$ of a sine wave, which may or may not including a peak point value of said sine wave; said "n" being an integer.

3. A cycle-modulating type of DTMF generator as claimed in claim 1, wherein a data stored in said memory unit is a data value set between a phase angle of $(n·360°)$ to $(90°+n·360°)$ and a phase angle of $(270°+n·360°)$ to $((n+1)·360°)$ of a sine wave; including or excluding a peak point of said sine wave, and "n" being an integer.

4. A cycle-modulating type of DTMF generator as claimed in claim 3, wherein said peak point value is a peak point set at a phase angle of $(90±n·180°)$; and "n" therein being an integer.

5. A cycle-modulating type of DTMF generator as claimed in claim 1, wherein said column counter is a column up/down counter.

6. A cycle-modulating type of DTMF generator as claimed in claim 1, wherein said row counter is a row up/down counter.

* * * * *